United States Patent [19]

Solomon

[11] Patent Number: 4,706,006

[45] Date of Patent: Nov. 10, 1987

[54] DUAL-AXIS TACTILE FEEDBACK LIGHT CONTROL DEVICE

[75] Inventor: Dennis Solomon, Yarmouth Port, Mass.

[73] Assignee: Altman Stage Lighting Co., Inc., Yonkers, N.Y.

[21] Appl. No.: 925,165

[22] Filed: Oct. 31, 1986

[51] Int. Cl.$^4$ .............................................. G05B 1/06
[52] U.S. Cl. .................................... 318/640; 250/221
[58] Field of Search ............... 318/640, 575, 577, 480; 266/318, 319; 250/221

[56] References Cited

U.S. PATENT DOCUMENTS

| | | | |
|---|---|---|---|
| 3,956,681 | 5/1976 | Vail et al. | 318/640 |
| 4,024,446 | 5/1977 | Burnett | 318/640 |
| 4,533,827 | 8/1985 | Fincher | 250/221 |
| 4,584,510 | 4/1986 | Hollow | 318/640 |

*Primary Examiner*—William M. Shoop, Jr.
*Assistant Examiner*—David Martin

*Attorney, Agent, or Firm*—Lackenbach, Siegel, Marzullo & Aronson

[57] ABSTRACT

A light control system operable by one hand for directing the movements of a luminaire rotatably movable to a plurality of liminaire positions about a Y-axis and an X-axis by a pan motor and a tilt motor, respectively. The control system includes a first disk rotatably mounted to a support panel and a second disk rototably mounted to the first disk at the axis of the first disk perpendicular to the first disk. Code markings such as code bars marked around the circumferential periphery of each disk are indexed to the desired movements of the luminaire by simultaneously processing signals from optical pickoffs for the first and second disks and transmitting the processed signals to the pan and tilt motors. The primary received signals are analog signals which are converted to digital signals. An operator knows the position of the luminaire by manual touch feedback relating to the positions of the first and second disks.

22 Claims, 8 Drawing Figures

U.S. Patent  Nov. 10, 1987  Sheet 1 of 4  4,706,006
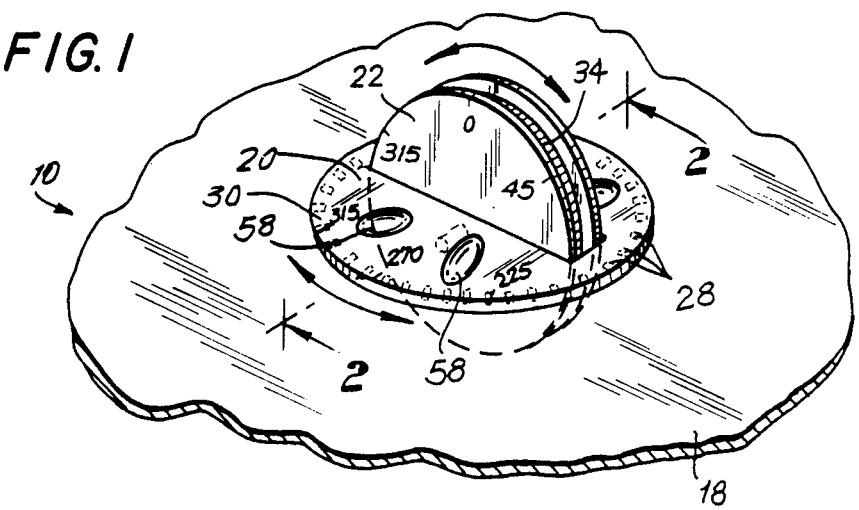
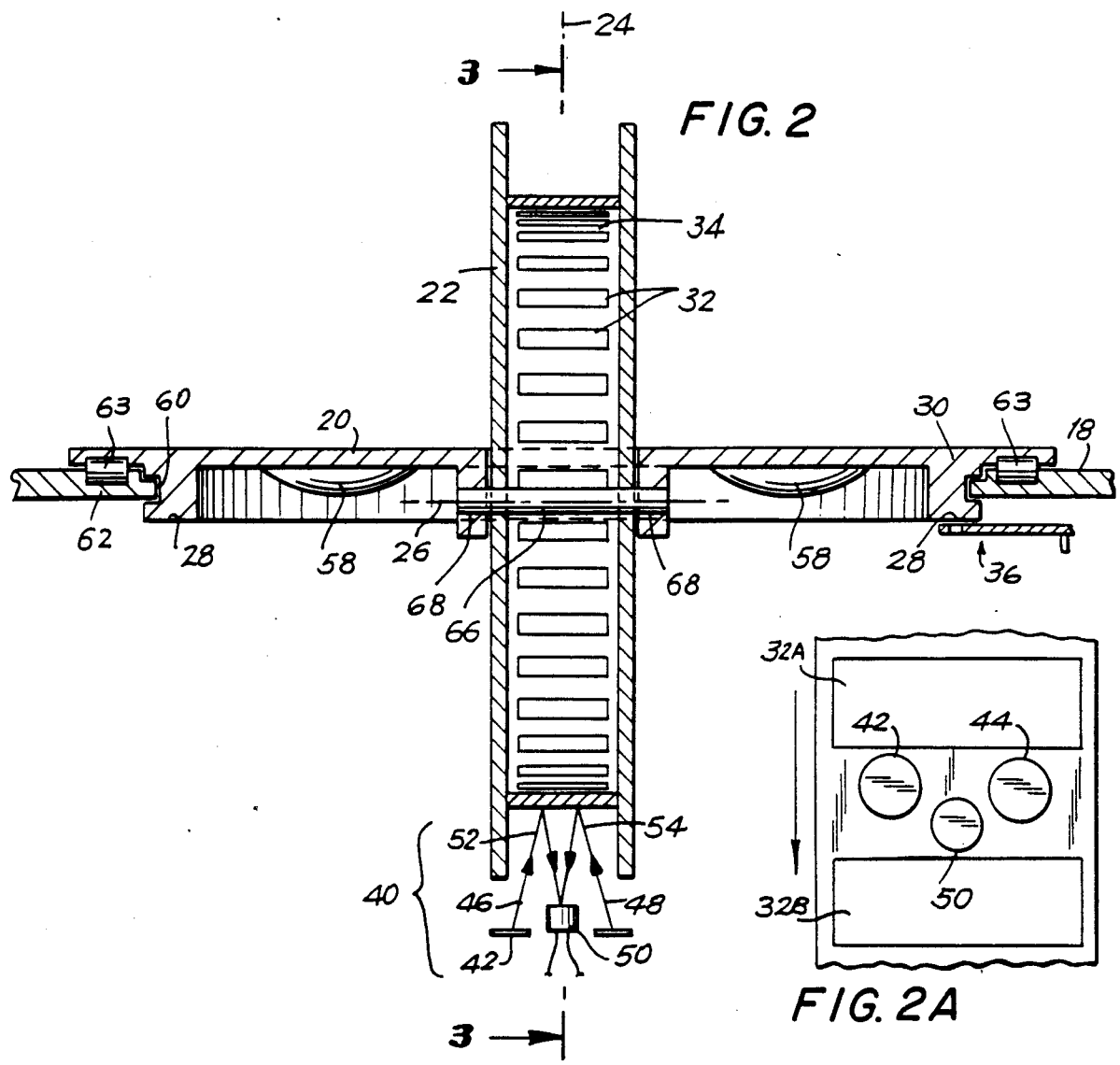

DUAL-AXIS TACTILE FEEDBACK LIGHT CONTROL DEVICE

This invention relates to a device for controlling the direction of a luminaire and more particularly to a tactile device that controls a luminaire movable about two axes.

BACKGROUND OF THE INVENTION

Luminaires for stage lighting and for decorative displays are typically movable on a horizontal axis (X-axis) and a vertical axis (Y-axis) with the luminaire movable around each axis by separate tilt and pan motors, respectively. The motors are sent signals by an operator that originate in accordance with various types of hand control devices. For the typical type of control system an operator tactically operates one hand device with one hand to send one signal for X-axis movement of the luminaire and another hand device with the other hand to send another signal for Y-axis movement of the luminaire.

The type of control device that is most desirable, however, is one that can be operated with one hand about both the X-axis and the Y-axis simultaneously. Such a device can be compared to the joystick of an aircraft, the mouse control for a video screen, or the control ball of a video game device.

One type of luminaire that is movable about an X-axis and a Y-axis is described in my concurrent U.S. patent application entitled "Low-Inertial Beam Direction Lighting System" Ser. No. 926,632 filed 11/3/86.

SUMMARY OF THE INVENTION

It is an object of the present invention to provide a light control system that an operator can use to direct signals to a luminaire for movement about both the X-axis and the Y-axis with one hand.

It is another object of this invention to provide a light control system for operation of a luminaire about both the X-axis and the Y-axis that is operable with one hand and that also provides a tactile feedback to the operator as to the position of the luminaire and also the direction the luminaire is being moved.

In accordance with these and other objects that will become apparent hereinafter a light control system for controlling the movement of a luminaire about Y-and X-axes in accordance with the present invention is described below.

A light control system is operable by one hand for directing the movements of a luminaire rotatably movable to a plurality of luminaire positions about a Y-axis and an X-axis by a pan motor and a tilt motor, respectively. The control system includes a first disk rotatably mounted to a support panel and a second disk rotatably mounted to the first disk at the axis of the first disk perpendicular to the first disk. Code markings such as code bars marked around the circumferential periphery of each disk are indexed to the desired movements of the luminaire by simultaneously processing signals from optical pickoffs for the first and second disks and transmitting the processed signals to the pan and tilt motors. The primary received signals are analog signals which are converted to digital signals. An operator knows the position of the luminaire by manual touch feedback relating to the positions of the first and second disks. The code markings for the second disk may be placed on the first disk.

The present invention will be better understood and the objects and important features, other than those specifically enumerated above, will become apparent when consideration is given to the following details and description, which when taken in conjunction with the annexed drawings, describes, discloses, illustrates, and shows a preferred embodiment or modification of the present invention and what is presently considered and believed to be the best mode of practice in the principles thereof. Other embodiments or modifications may be suggested to those having the benefits of the teachings herein and such other embodiments or modifications are intended to be reserved especially as they fall within the scope and spirit of the subjoined claims.

BRIEF DESCRIPTION OF THE DRAWINGS

FIG. 1 is a perspective view of the light control device shown mounted on a control board;

FIG. 2 is a view taken through plane 2—2 of FIG. 1;

FIG. 2A is a detail view of encoded bars and encoding device.

DESCRIPTION OF THE PREFERRED EMBODIMENT

Figure 3:
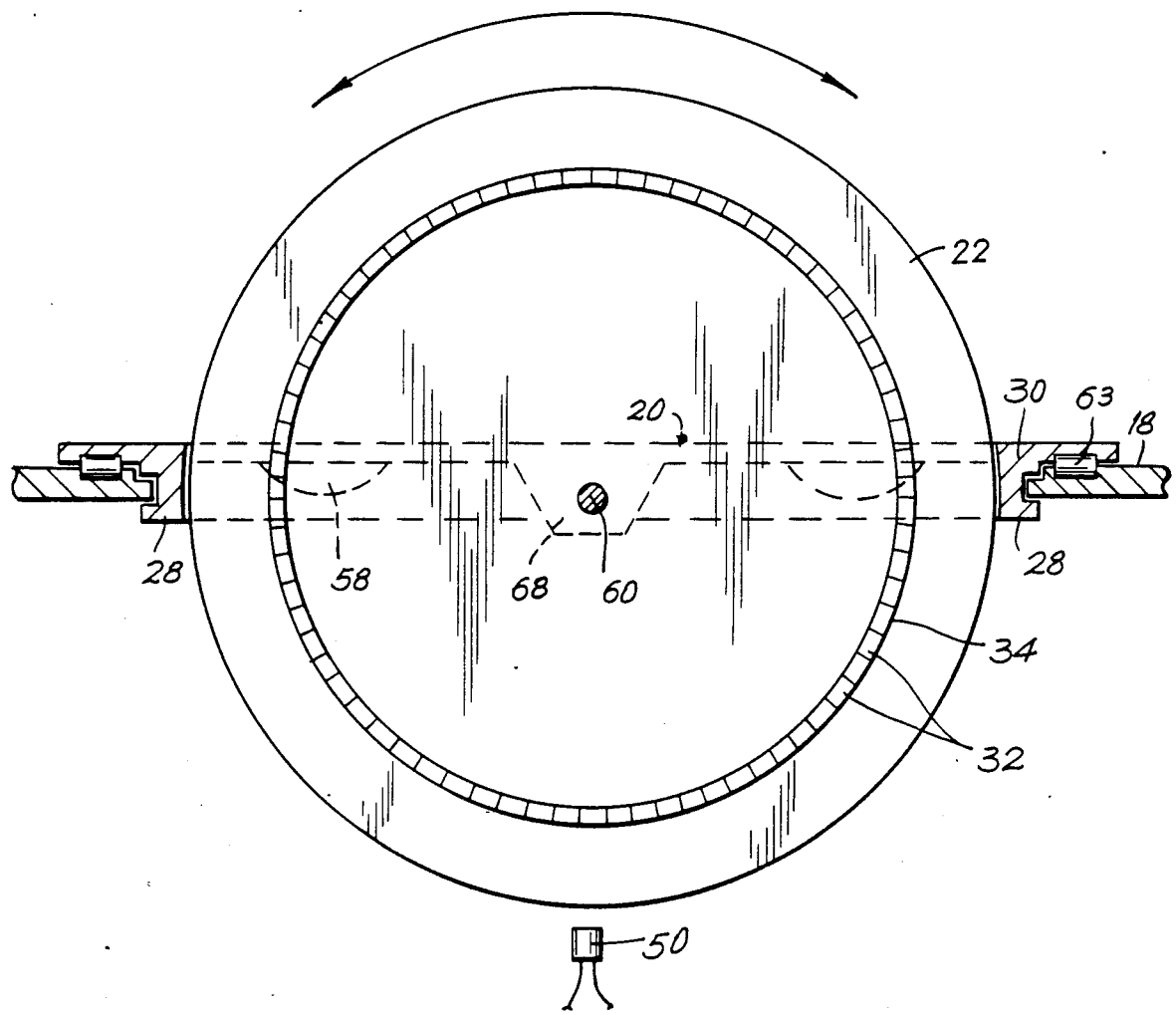
FIG. 3 is a view taken through line 2—2 of FIG. 2.

Reference is now made specifically to the drawings in which identical or similar parts are designated by the same reference numerals throughout.

Figure 5:
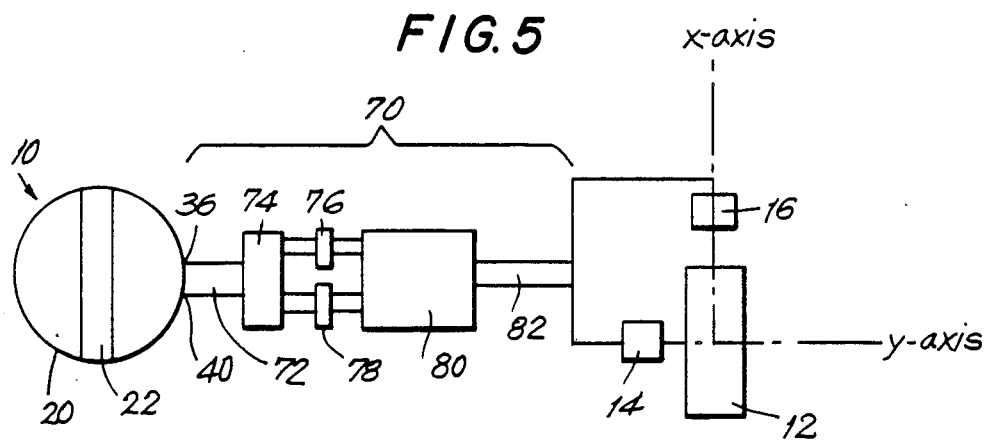
FIG. 5 is a block diagram of the signaling system between the light control device and the luminaire.

A light control system 10 for a luminaire 12 is shown in FIGS. 1, 2, 3, and 5. Luminaire 12, as shown in FIG. 5, is rotatably movable over a rotational distance to a plurality of luminaire positions about a vertical Y-axis by a pan motor 14 and over a rotational distance to a plurality of positions about a horizontal X-axis by a tilt motor 16. Light control system 10 includes a support structure indicated by a portion of a horizontal support wall 18, a first disk member 20 rotatably mounted to support wall 18, and a second disk member 22 rotatably mounted to first disk member 20. First disk 20 is lies in a first plane, which is shown as horizontal in FIG. 1 but which may be other than horizontal, and is rotatably mounted to support wall 18 for a first circular movement to a plurality of selected first positions about a first axis 24. Second disk 22 lies in a second plane, shown as vertical in FIG. 1 but which may be other than vertical, aligned perpendicular to the first plane of first disk 20 and has a second axis 26 which is aligned perpendicular to first axis 24 and with the first plane of first disk 20. Second disk 22 is rotatably mounted to first disk 20 for a second circular movement to a plurality of selected second positions about a second axis 26.

First code marks 28, generally rectangular bars as is known in the art, are located about the entire periphery, preferably on the underside periphery 30, of first disk member 20. Code marks, or code bars, 28 are aligned with their long dimensions directed towards axis 24. Code bars 28 index the plurality of first positions of first disk 20 to the plurality of first positions of luminaire 12 about the Y-axis. Second disk 22 has a cylindrical rim having an outer cylindrical surface 34 parallel to second axis 26. Second code marks 30, also generally rectangular bars as is known in the art, are located entirely around outer cylindrical surface 34. Code marks, or code bars, 30 are aligned with their long dimensions parallel to axis 26. Code bars 30 index the plurality of second positions of second positions of second disk 24 to the plurality of second positions of luminaire 12 about the X-axis.

A first optical encoding device 36 mounted to the support structure generates optical signals directed at first code bars 28 at a position along the path of movement of the underside of periphery 30, and in addition first encoding device 36 receives first code signals reflected from first code bars 28 and directs these signals to activate pan motor 14 for rotation of luminaire 12 to a first luminaire position about the Y-axis in a manner that will be explained below.

A second optical encoding device 40 mounted to the support structure generates optical signals directed at second code bars 32 at a position along the path of movement of outer cylindrical surface 34, and in addition second encoding device 40 receives second code signals reflected from second code bars 32 and directs these signals to activate tilt motor 16 for rotation of luminaire 12 to a first luminaire position about the X-axis in a manner that will be explained below. The embodiment shown in FIG. 2 shows second encoding device 40 as including a double detector, or two sensory optical beam pickoffs, or sources, 42 and 44 generating sensory optical beams 46 and 48, respectively, directed at second code marks 32. Second encoding device 40 also includes a phototransistor 50 which receives either second code signal 52 or 54 relating to beams 46 and 48, respectively. Either code signal 46 or 48, will first strike one of second bars 32 during operator rotation of second disk 22 and be reflected back to phototransistor 50 from where the signal is directed to tilt motor 16. In FIG. 2A code signals 52 and 54 from sensory optical beam sources 46 and 48 strike a code bar 32A after leaving code bar 32B during rotation of second disk 22 in the direction indicated by arrow. When first disk 20 is being rotated simultaneously with second disk 22, code bars 32 are likewise rotated somewhat relative to optical beam sources 46 and 48 so that two beam sources will ensure an accurate reading. A single sensory optical beam source, however, is also within the scope of the invention.

Figure 4:
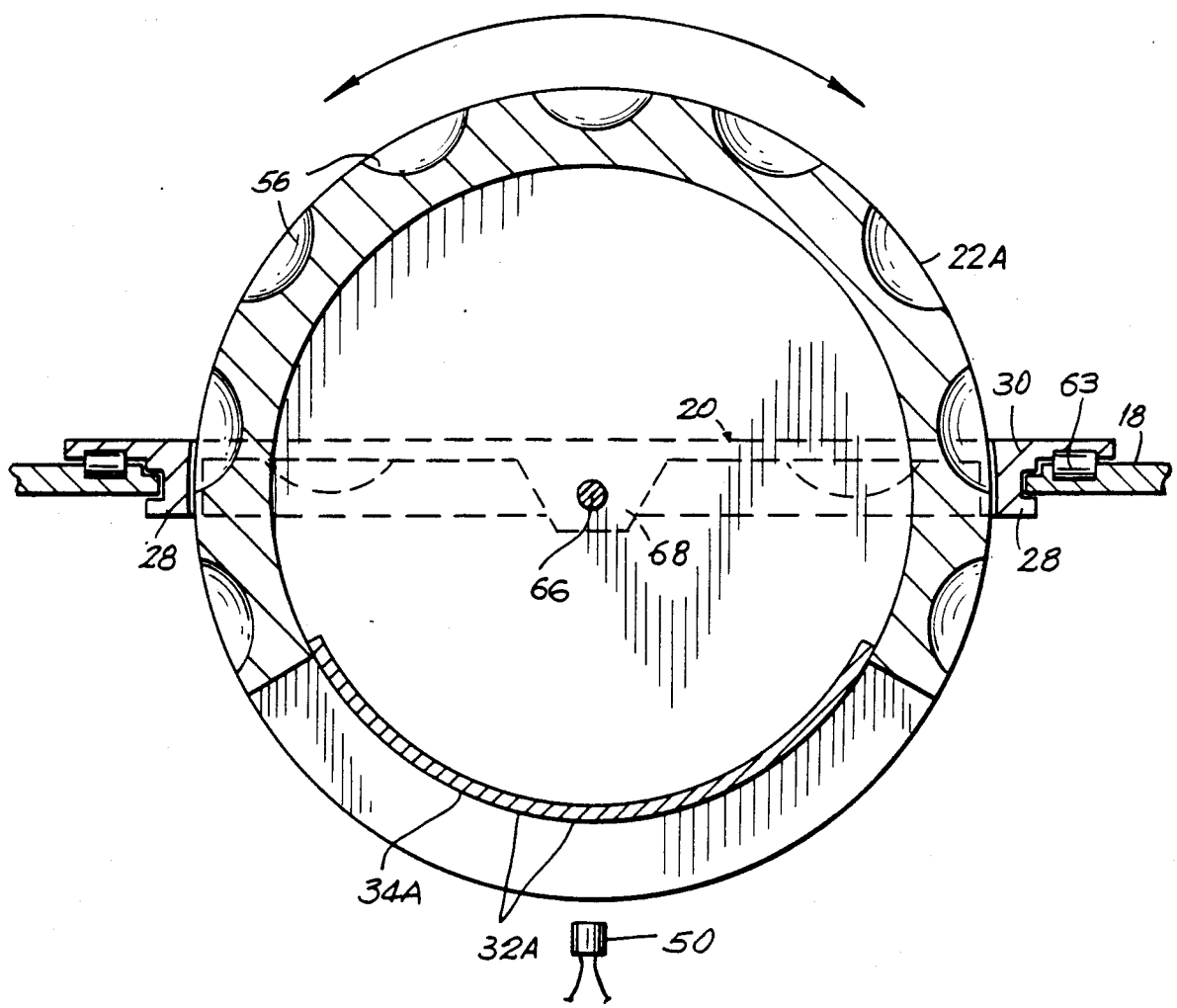
FIG. 4 is a view analogous to the view of FIG. 3 of an alternate embodiment of the invention.

FIGS. 1—3 show an outer cylindrical surface 34 with code bars 32 that extend 360° around the circumference of second disk 22. Code bars 32 are directly indexed to a 360° tilt rotation of luminaire 12 if the luminaire is so constructed. The same is true of code bars 28 which extend 360° around first disk 20 in FIGS. 1–3 so that the code bars are directly indexed to a 360° pan rotation of luminaire 12. FIG. 4 illustrates a second disk 22 which has an outer cylindrical surface 34A analogous to outer cylindrical surface 34 extending approximately 45° around the circumference. Second code bars 32A located on surface 34A likewise extend 45°. For example, when luminaire 12 is capable of tilting 360°, code bars 32A are indexed to allow for the differentiation so that the distance read by phototransistor 50A will be transmitted at 8 times the actual distance covered. Likewise, first code bars 28 can be positioned at less than 360° for a 360° pan rotation of luminaire 12. FIG. 4 illustrates the remaining circumferential distance around second disk 22 forming a plurality of finger recesses 54 to enhance operator control. Finger recesses 56 are also shown in FIGS. 1–3.

Support wall 18 forms a circular hole 60 having a peripheral area 62 around hole 60 with periphery 30 of first disk 20 rotatably positioned over peripheral area 62. A series of bearings 63 are positioned between peripheral area 62 and periphery 30 for supporting first disk 20 during rotational movement. First disk 20 forms an elongated slot 64 along the plane of second disk 22, that is, perpendicular to axis 26 and with the center of slot 64 being positioned at the geometric center of first disk 20, that is, at axis 24. The length of slot 64 is slightly greater than the diameter of second disk 22, with second disk 22 being rotatably mounted in slot 64 so aligned that its axis 26 extends approximately midway of the thickness of first disk 20. A pin member 66 extending through second disk 22 at axis 26 is rotatably mounted in opposed pin supports 68 formed by first disk 20.

FIG. 5 illustrates in block diagram a signal transmission system 70 that receives the first and second code signals from first and second encoding devices from first and second encoding devices 36 and 40. The first and second code signals are related to the intensity of the signals since the beams of the sensory beam sources of first and second encoders 36 and 40 have beam cross-sectional areas so that the area of the beam reflected back to the phototransistor of the particular encoder is proportional to the area of the code bar encountered. Thus first and second encoding devices 36 and 40 emit first and second analog signals for processing by signal transmission system 70. The first and second analog signals are directed by a bus 72 to an optical decoder 74 from where first and second decoded signals are directed to horizontal and vertical positioners 76 and 78, respectively, from where the signals are sent to an analog/digital computer 80 and then to a control bus 82 for distribution to pan motor 16 and tilt motor 14.

Figure 6:
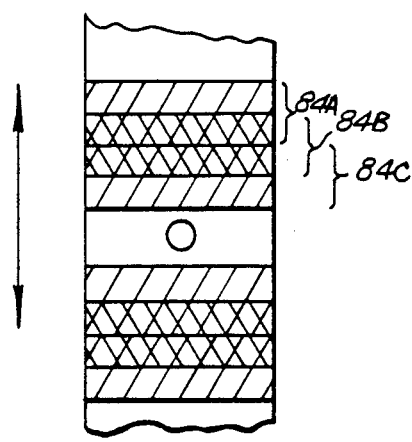
FIG. 6 is a detail view of two encoded bars having chromatic overlays.

FIG. 6 illustrates in an isolated view two chromatic code bars 84 each including three differentiated, overlapping chromatic code bar areas, 84A, 84B, and 84C, which can be suitably contrasting colors as is known in the art. When the beams of the detector pickoffs, such as sensory beam sources 42 and 44, for example, move from color to color over the code bar, different intensities of light are reflected back to the receiver, such as phototransistor 50, with the result that the margin for error in the readings is reduced. This is particularly relevant in second disk 22, which is rotated as first disk 20 is rotated with the result that the code bars are rotated. The pickoffs directed at chromatic code bars 84 reflect more exact readings than when the unicolored code bars 32 are used.

Figure 7:
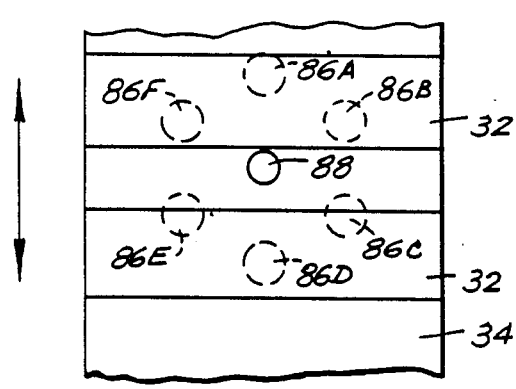
FIG. 7 is a detail view of the vertically operable control wheel with an array of six optical pickoffs aligned with two code bars.

FIG. 7 illustrates an alternate embodiment of the invention with first and second code bars being both positioned on outer cylindrical surface 34 of second disk 22 so that first disk 20 has no code marks. An array of six sensory optical beam sources 86A, 86B, 86C, 86D, 86E, and 86F are symmetrically positioned around a central phototransistor 88. The sensory beams generated by beam sources 86A-F reflect back data readings to phototransistor related to the angular positions of both first and second disks 20 and 22 since angular readings related to first disk 20 are made possible by the beam interception of the rotational movement of code bars 32 when first disk 20 is rotated by an operator.

The embodiments of the invention particularly disclosed and described hereinabove are presented merely as examples of the invention. Other embodiments, forms, and modifications of the invention coming within the proper scope and spirit of the appended claims will, of course, readily suggest themselves to those skilled in the art.

What is claimed is:

1. A light control system for a luminaire rotatably movable over a first rotational distance to a plurality of first luminaire positions about a Y-axis by a pan motor and over a second rotational distance to a plurality of second luminaire positions about an X-axis by a tilt motor, comprising, in combination:

a support structure, first disk means aligned with a first plane and having a first axis, said first disk means being rotatably mounted to said support structure for a first circular movement to a plurality of selected first positions about said first axis, second disk means aligned with a second plane approximately perpendicular to said first plane and having a second axis aligned approximately perpendicular to said first axis and with said first plane, said second disk being rotatably mounted to said first disk for a second circular movement to a plurality of selected second positions about said second axis, first code means associated with said first disk means for indexing said plurality of first positions of said first disk to the plurality of first luminaire positions, second code means located on said second disk means for indexing said plurality of second positions of said second disk to the plurality of second luminaire positions, first encoding means for generating optical signals directed at said first code means, for receiving first code signals reflected from said first code means, and for directing said first code signals to activate said tilt motor for rotation of said luminaire to a selected first luminaire position, and second encoding means for generating optical signals directed at said second code means, for receiving second code signals reflected from said second code means, and for directing said second code signals to activate said pan motor for rotation of said luminaire to a selected second luminaire position.

2. The light control system according to claim 1, wherein said first code means is located on said first disk means.

3. The light control system according to claim 1, wherein said support structure forms a circular hole having a peripheral area around said hole and said first disk means is a first disk having a first disk periphery rotatably positioned over said peripheral area.

4. The light control system according to claim 3, said first disk forming an elongated slot along said second plane, said second disk being positioned in said slot.

5. The light control system according to claim 4, further including a pin member extending through said second disk at said second axis, said first disk having opposed pin supports on opposed sides of said slot, said pin member being positioned in said pin supports for rotational movement of said second disk.

6. The light control system according to claim 1, wherein said first code means includes a plurality of first code marks which are located on at least a portion of said first disk periphery, said code marks being indexed to said plurality of first luminaire positions.

7. The light control system according to claim 6, wherein said first code marks are located entirely about said circular portion.

8. The light control system according to claim 6, wherein said first encoding means includes a first encoder mounted to said support structure and positioned proximate the path of said circular portion of said first disk.

9. The light control system according to claim 8, wherein said first encoder is a first optical encoder.

10. The light control system of claim 9, wherein said second disk means includes a second disk having a cylindrical rim having an outer cylindrical surface parallel to said second axis, and said second code means includes a plurality of second code marks that are indexed to the plurality of second luminaire positions, said second code marks being located on at least a portion of said outer cylindrical surface of said cylindrical rim.

11. The light control system of claim 10, wherein said second encoding means includes a second encoder mounted to said support structure and positioned proximate the path of said outer cylindrical surface.

12. The light control system of claim 11, wherein said second encoder is a second optical encoder.

13. The light control system of claim 12, wherein said second optical encoder includes at least one sensory optical beam source which generates a sensory optical beam directed at said second code marks and further includes a phototransistor which receives said second code signals from said second code marks and transmits said second code signals to said tilt motor.

14. The light control system of claim 13, wherein said at least one sensory optical beam source includes two spaced sensory optical beam sources generating two sensory beams directed so as to strike said outer cylindrical surface at slightly different cylindrical positions, whereby a true reading of said second code marks is achieved during rotation of said first disk.

15. The light control system of claim 1, wherein said first code signals and said second code signals are transmitted as analog first and second code signals.

16. The light control system of claim 1, further including signal transmission means for receiving said analog first and second code signals from said first and second encoders, for converting said analog first and second code signals to digital first and second signals, and for transmitting said digital first and second signals to said pan and tilt motors.

17. The light control system of claim 16, wherein said signal transmission means includes a first bus to receive said analog first and second signals from said first and second encoding means, an optical decoder to receive said analog first and second signals from said first bus, horizontal (pan) and vertical (tilt) positioners receiving said analog first and second signals from said optical decoder, a computer for receiving said analog first and second signals from said decoder and for converting said analog first and second signals to digital signals, and a control bus to direct said digital first and second signals from said computer to said pan and tilt motors.

18. The light control system of claim 10, wherein said second code marks are a plurality of spaced code bars indexed to said plurality of second luminaire positions.

19. The light control system of claim 18, wherein each of said spaced code bars is a series of chromatically differentiated and overlapping bar portions.

20. The light control system of claim 1, wherein said first code means is located on said cylindrical surface.

21. The light control system of claim 3, further including bearing means positioned between said peripheral area and said first disk periphery for supporting said first disk during rotational movement.

22. The light control system of claim 1, wherein said second disk means includes a second disk having a cylindrical rim having an outer cylindrical surface parallel to said second axis; said first and second code means include a plurality of first and second code marks located on at least a portion of said outer cylindrical surface, said first and second code marks being indexed to the plurality of the first and second luminaire positions; and said first and second encoding means include a plurality of sensory optical beam sources generating a plurality of sensory beams and a phototransistor which receives said first and second code signals reflected from said first and second coding marks, said plurality of sensory optical beam sources being symmetrically arranged in relation to said phototransistor so that rotational movement of said first and second disk means is detected at said phototransistor and transmitted therefrom to said pan and tilt motors.

* * * * *